Sept. 6, 1927.
J. G. JONES
CONVEYER
Filed July 16, 1924
1,641,437
5 Sheets-Sheet 1
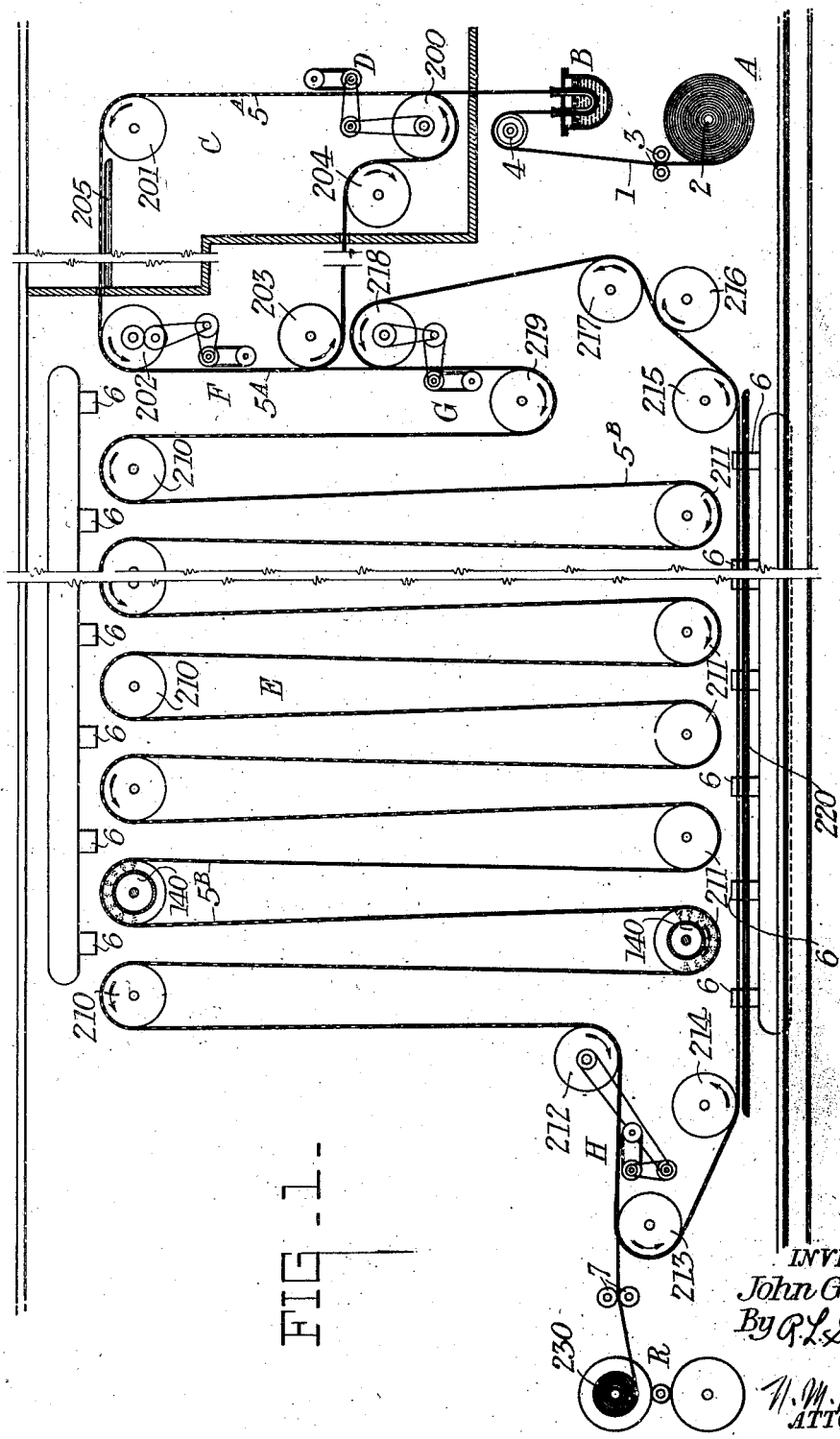
FIG_1_
INVENTOR,
John G. Jones,
By R. L. Stinchfield
W. M. Perrins
ATTORNEYS.

Sept. 6, 1927. 1,641,437
J. G. JONES
CONVEYER
Filed July 16, 1924 5 Sheets-Sheet 2
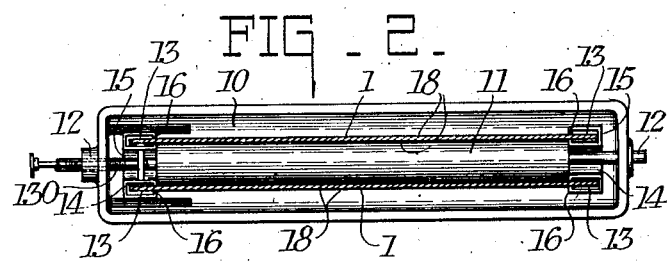
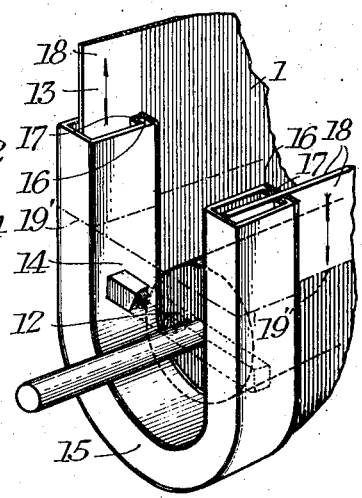
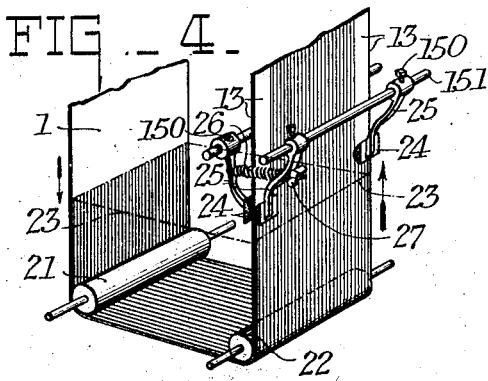
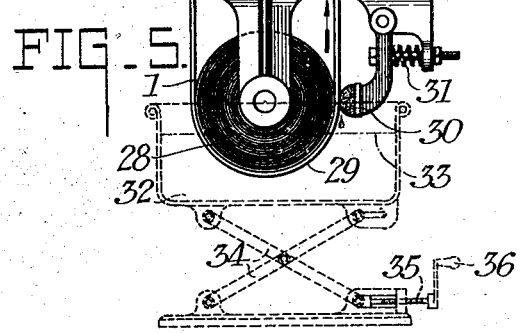
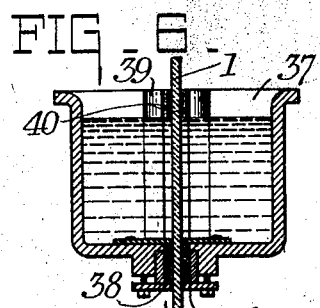
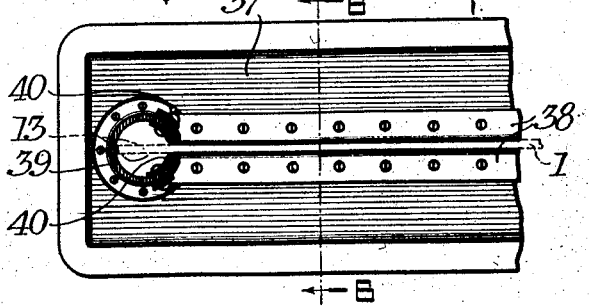
INVENTOR,
John G. Jones,
BY R. L. Stinchfield
N. M. Perrins
ATTORNEYS.

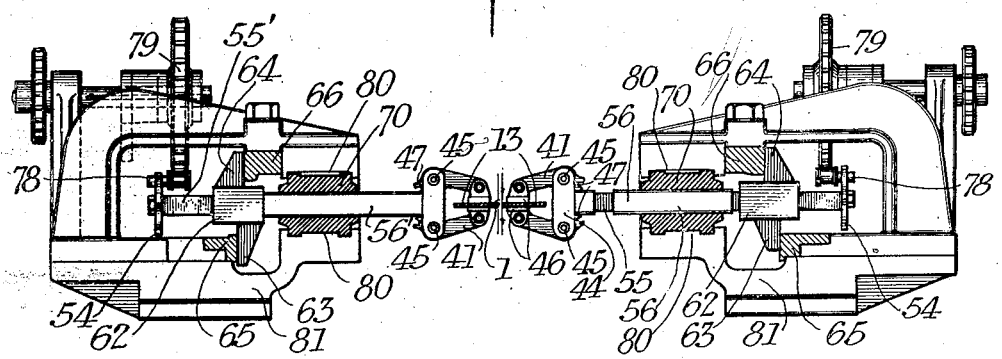
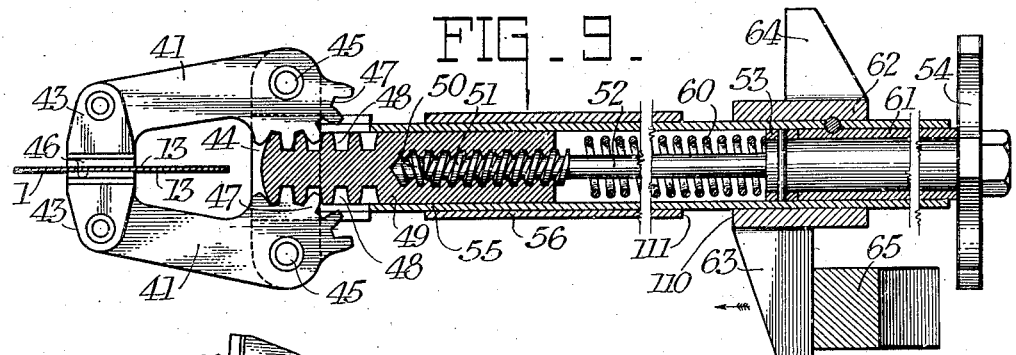
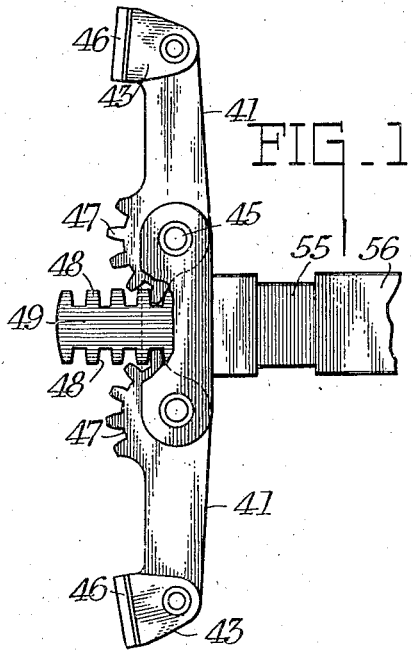
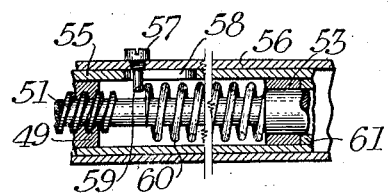

Sept. 6, 1927.  
J. G. JONES  
CONVEYER  
Filed July 16, 1924  
1,641,437  
5 Sheets-Sheet 4
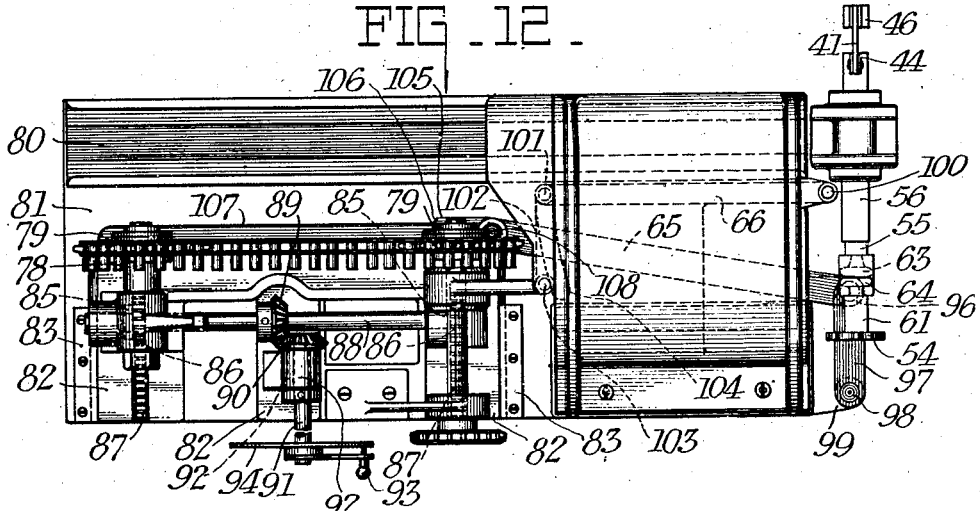
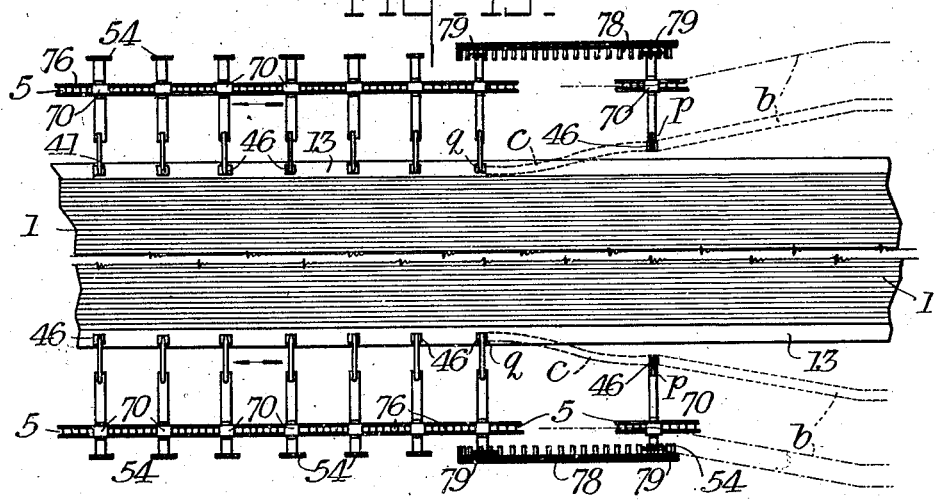
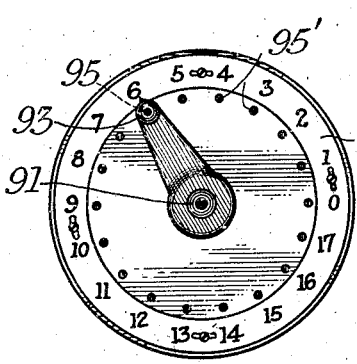
INVENTOR,
John G. Jones,
BY R. L. Stinchfield
N. M. Perrin
ATTORNEYS.

Sept. 6, 1927.
J. G. JONES
1,641,437
CONVEYER
Filed July 16, 1924
5 Sheets-Sheet 5
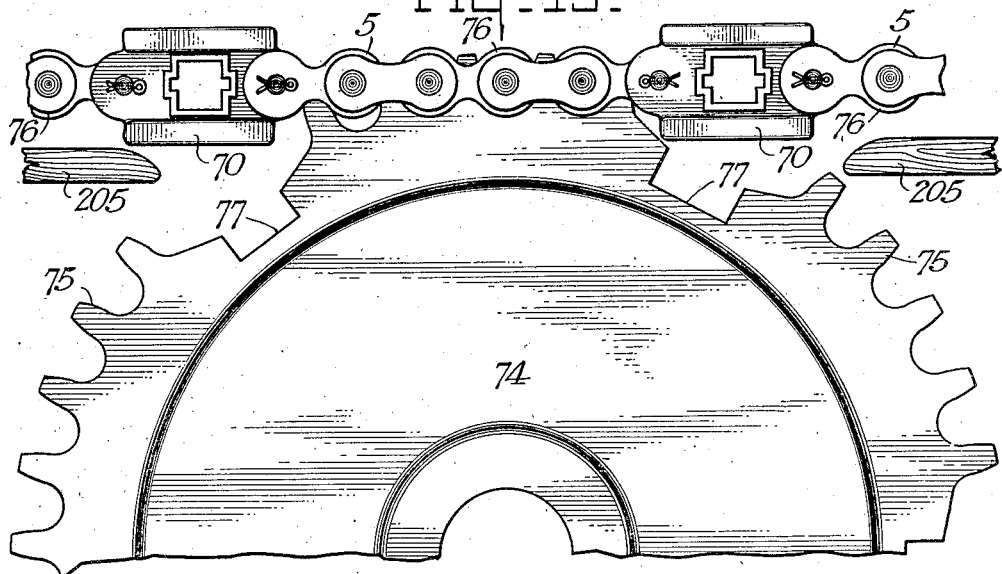
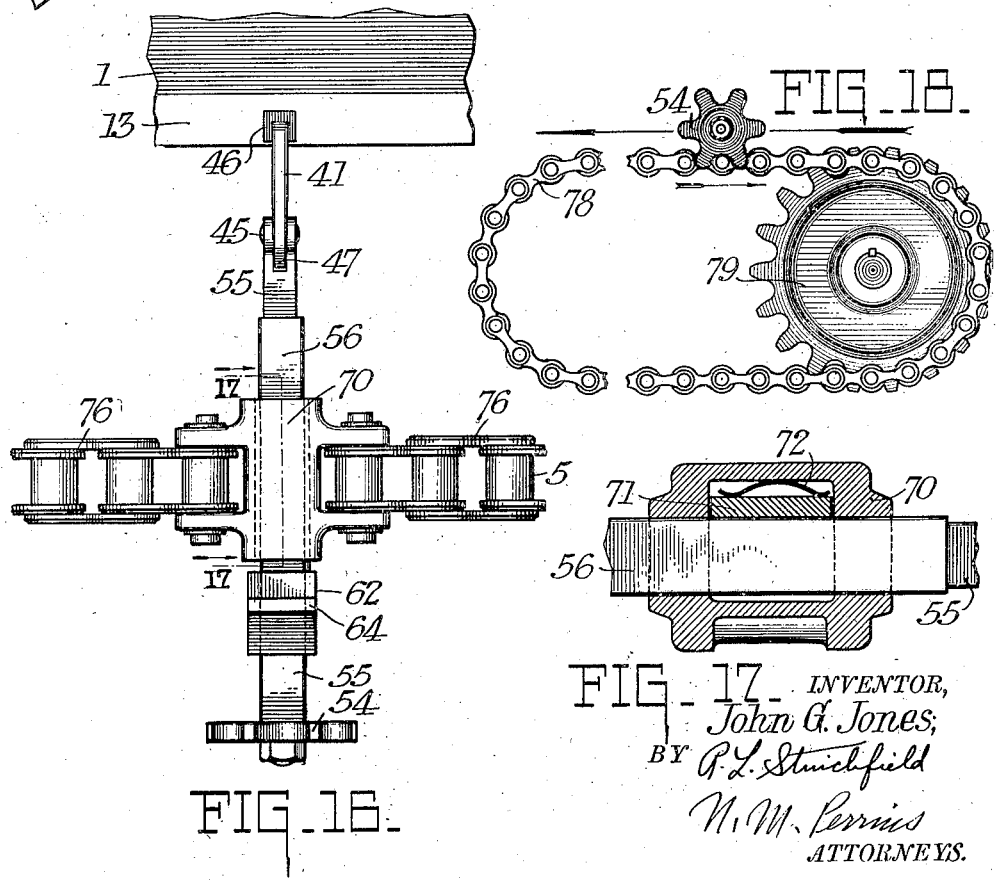
INVENTOR,
John G. Jones;
BY
ATTORNEYS.

Patented Sept. 6, 1927.

1,641,437

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

CONVEYER.

Application filed July 16, 1924. Serial No. 726,394.

This invention relates to conveyers and more particularly to such apparatus for use with freshly coated sheet material, in the form of a long continuous web or band, the edges of which are engaged by automatically actuated gripping means, which convey them through a drying chamber and then automatically release them. After passing through one or more chambers the band is rewound.

As shown and described the apparatus is particularly designed for applying a coating of sensitive material to both surfaces of a cellulosic film, which is then chilled and dried. The invention is applicable however to many other uses.

The band while gripped and conveyed is maintained under lateral tension that permits variation in width and insures against buckling particularly when the band is carried around bends by the conveyer. Novel, adjustable, automatic means are provided for the adjustment and operation of the clamps which are also novel.

My invention resides not only in the several combinations and particular features mentioned above but also in all of the details herein described and shown and in the combinations existing between them. For a fuller understanding of the invention reference is made to the specification and to the claims at the end thereof.

I have illustrated my invention in the accompanying drawings, to which reference will now be made and in which the same reference characters denote the same parts throughout.

In the drawings, wherein like reference characters denote like parts throughout:

Fig. 1 is a diagrammatic side elevation of a machine constructed in accordance with and illustrating one embodiment of my invention;

Fig. 2 is a plan view of one type of coating device used with my machine;

Fig. 3 is a perspective view of the edge protecting device used with the tank shown in Fig. 2;

Fig. 4 is a perspective of another type of film coating and edge wiping mechanism;

Fig. 5 is an end elevation of a single coating and edge wiping device;

Fig. 6 is a section on line 6—6 of Fig. 7;

Fig. 7 is a fragmentary plan of still another type of coating and edging tank;

Fig. 8 is a section showing in elevation the strip carrying mechanism certain parts being broken away;

Fig. 9 is an enlarged detail, partly in section showing a strip gripper;

Fig. 10 is a side elevation of the gripper having the jaws open;

Fig. 11 is a fragmentary detail section of a portion of telescoping tubular members forming a part of the grippers;

Fig. 12 is a plan view of a strip gripping station;

Fig. 13 is a plan view showing diagrammatically the coated strip material approaching and being grasped by the gripping mechanism;

Fig. 14 is a front elevation of a setting dial used at the film gripping station;

Fig. 15 is an enlarged detail showing in elevation a portion of a strip carrying chain and a driving sprocket;

Fig. 16 is a plan showing a gripper as carried by the chain;

Fig. 17 is an enlarged detail on line 17—17 of Fig. 16, and

Fig. 18 is an elevation of parts of the gripping and degripping mechanism.

Broadly, this machine is for drawing strip material from a supply roll, coating one or both sides with a fluid coating, wiping or scraping the edges of the material free from the coating, carrying the strip material by the cleaned edges without contact with the coating or coatings through suitable treatment chambers for conditioning, setting and drying the coating or coatings, and finally winding the coated strip material upon suitable cores in lengths and condition for further use.

Fig. 1 shows schematically a preferred embodiment of my invention. Here the strip material may be coated, the coating set, and then dried after which it is wound up in a roll.

The strip material, which may be paper, cloth, nitro-cellulose, fabric or the like, 1, is placed on a spindle 2, at the supply station A. From this station it may be led over suitable guide rollers 3 and 4 to the coating station B, then into a treatment chamber C, where, in this instance the coating is chilled and set, and where it is grasped by grippers carried by chains 5, by which the strip is supported. The gripping station in chamber C is indicated at D. From this chamber the strip 1 is carried into chamber E where the coating may be dried as by air from pipes 6. I prefer to use separate conveyers for chambers C and D as by doing this the chambers can be more easily held at the desired temperatures and trouble due to condensation is at least partially overcome. Consequently I de-grip the film at F and grip at G, finally de-gripping at H just before the strip 1 passes through rollers 7 to the rewinding station R. Obviously the gripping and de-gripping stations are located in any positions desired which may prove convenient.

In Figs. 2 to 7 inclusive I have shown coating devices. In Figs. 2 and 3 is shown the preferred form of the coater consisting of a tank 10 containing the coating liquid through which strip 1 is passed about roller 11 carried by bearings 12, and preferably driven at the surface speed of the strip 1 although the roller may be moved solely by the strip 1. In this device the strip edges 13 are not coated, being drawn through protecting troughs 14 in which there is no coating fluid. As shown in Fig. 2 the troughs 14 may consist of a bent tube 15 having a slot 16 faced with soft felt or rubber edges 17 which press against the sides 18 of sheet 1. The resilience of the metal of the tubes or of the material 17 or of both serve, both in this form and in the form later to be described and shown in Figs. 6 and 7, to cause the effective surfaces of the slot to yieldingly press toward one another and to exclude the liquid coating material from the slot, particularly when the edges of the sheet or web are positioned in the tubes.

In order to provide for webs of different widths, screw means 130 is provided for adjusting the position of at least one tube toward or from the other.

The coating material is in the tank and comes up to the line 19' of the troughs. The strip 1, is therefore coated on both sides 18, and the edges 13 are free from coating, so that the grippers will not become gummed up or become otherwise unfit for use.

Fig. 4 shows two rollers 21 and 22 which may be mounted in a tank having a coating up to the level of line 23, above which line are pairs of wipers 24. As here shown the entire sheet 1 is coated on both sides, and the edges 13 are wiped or scraped free from coating. Wipers 24 are carried by arms 25 adjustably mounted by screws 150 on shafts 151 and which tend to turn to bring the wipers together under the impulse of a spring 26 which may be more or less tensioned by wing nut 27. This type double coats the strip.

In Fig. 5 the strip passes about a large roller 28 and is coated on one side only, 29, a single pair of wipers 30 being provided to clean the edges. These wipers are held against the strip by springs 31. The tank 32, having a solution level indicated by line 33, may be moved by lazy tongs 34 into the coating position shown in dashed lines by the screw 35 operated by handle 36.

In Figs. 6 and 7 a double coating tank is shown in which the strip 1 is drawn straight through the tank 37 having a slot protected against leakage along the bottom by gaskets 38; and having the edges 13 protected during the passage through the tank by edge pipes 39 having suitable edging at 40. The edges 13 remain uncoated.

After coating the strip on either or both faces and after providing a clean or uncoated edge, the strip is led to the gripping station D where it is seized by pairs of grippers 41 which move with pairs of chains 5, to carry the strip material through the various treatment chambers. Station D will now be described. Referring to Figs. 9 to 11, the grippers consist of jaw members 41 pivoted to bracket 44, at 45. These members are bent at one end to form jaws 43 with gripping portions 46; and at the other end they have gear segments 47, which mesh with the racks 48 on the square bar 49. This bar has an interiorly threaded bore at 50 to receive screw 51 on the end of shaft 52 pinned to collar 53 and carrying the pinion or star wheel 54. Bar 49 is slidably mounted in the square tube 55 which in turn is slidable in tube 56 to the extent permitted by screw 57 and slot 58 in tube 55 (Fig. 11). This screw 57 forms an abutment portion 59 for spring 60, which, by resting on this abutment and on collar 53 tends to hold the bar 49 to the right (of the showing in Fig. 9) or to draw the bar from the strip material 1.

Keyed to square tube 55 and to the sleeve 61 which properly locates star wheel 54 is a casting 62 having two extending flanges 63 and 64 which are adapted to position the jaws through contact with the locating bars 65 and 66, Fig. 8, as will be hereinafter fully described.

So far I have described the jaws on the "resilient" side of the machine. I prefer to use the spring actuated jaws on one side only although of course both may be resilient if desired.

In the present embodiment of my invention the jaws opposed to the resilient jaws are adjustable but have no spring tension. According, as shown in Fig. 8, the large square shaft 56' is relatively longer than shaft 56 and no provision is made for movement of the inner small square shaft 55' with respect to it. The jaw operating mechanism is the same in both cases, and so is the structure of block 62 with the flanges 63 and 64, although these, in the non-spring actuated jaw move 55' and 56' against the friction of block 71 and spring 72 each time a flange comes in contact with a cam bar for regulating the grippers for a different width of material, in a manner to be hereinafter described.

In both sides the parts of the jaws that are similar are designated by the same reference numerals. In both sides the larger square tube 56 is mounted to slide in the special link 70, and as shown in Figs. 16 and 17 is frictionally held therein by block 71, which is pressed by spring 72, carried in the recess 73 of link 70. This friction is sufficient to overcome the force exerted by spring 60 and is sufficient to hold the sheet material 1 without slipping; but it will nevertheless permit the jaw to be slid relative to link 70 by flanges 63 or 64 or by both to position the jaws.

Links 70 are spaced at intervals along the parallel chains 5 which pass over a series of sprockets 74 having teeth 75 for engaging the regular links 76 of chain 5 and having notches 77 to receive the special links 70.

From Fig. 9 it can be seen that when shaft 52 is rotated by star wheel 54 thereby turning screw 51, racks 48 will move to open or close the jaws. This star wheel is turned by a pin chain 78 shown in Figs. 12 and 18 carried upon sprockets 79, the length of the chain and the speed being such that as the star wheel is drawn along the path shown by arrow in Fig. 18, the jaws will be opened or closed according to the relative location of the chain to the star wheel; if on the bottom, as in Fig. 18 the jaws are opened, and if on top the jaws will be closed. Therefore, each time the gripping or de-gripping stations are reached a pin chain 78 is provided for actuating the grippers.

It should be noted here that the screw 51 tends to retain the racks 48 in a fixed position and the jaws when lowered upon the strip material are practically locked in this position, so that they will retain a firm grip upon strip 1 after they leave the jaw operating station, and they are also positively held in open position.

It is desirable to have the opposed gripping units adjustable to and from each other to care for different widths of material, and to this end, the units as a whole are slidably mounted in the special links as above described. The following mechanism is used for making an automatic adjustment for different widths of strip material: Referring to Figs. 8, 12 and 13, there is a track 80 carried by the table 81 for guiding the chains 5 past the gripping and de-gripping stations. The special links 70 slide in this guideway, and irrespective of the position of the grippers relative to links 70 these links slide on the guideway, and the chains always remain at the same spacing throughout. As above described the large square tube 56 carrying the gripping unit is slidably mounted in link 70 being normally frictionally retained by block 71. Flanges 63 and 64 are adapted to contact with the cam bars 65 and 66 and thus move the grippers. The straight broken lines $b$, Fig. 13, indicate the path through which the grippers may move with the cam bars set as in Fig. 12. The curved lines $c$ indicate the jaws moving from an open to a closed position to grip the strip material.

The pin chain 78 and sprockets 79 are carried on a movable carriage. This carriage 82 consists of a casting movable in rails 83 on the table 81. Bearings 85 of the carriage 82 support gears 86 which mesh with racks 87 affixed to the table and these gears are mounted on a shaft 88 turned manually through bevel gears 89 and 90 by a shaft 91. Gear 90 is carried by a sleeve 92 which is slidable along but turns with shaft 91, and bearing 92 forms a part of carriage 82. When handle 93 is moved over dial 94, it will by turning shaft 91 move the carriage to and from the chain. As shown in Fig. 14 the dial may be arbitrarily graduated to different widths, and may have apertures 95' into which a pin 95 carried by handle 93 may snap to hold the parts in the desired adjustment.

The movement of the carriage above described positions the pin chain 78. To move the gripping members with the star wheels a like amount I provide two cam bars 65 and 66, pivoted to the frame and to the carriage. Bar 65 is pivoted at 96 to a link 97 which is in turn pivoted at 98 to a frame bearing 99. Bar 66 is pivoted at 100 to the frame, and at 101 to link 102 which is pivoted at 103 to the carriage 82, a slot 104 forming a guideway for pivot 101. Cam bar 65 is pivoted to carriage 82 at 108. The carriage carries a track 105 which is comparatively short and it terminates in a shoulder 106 beyond which a long track 107 extends the length of the carriage.

Referring to Fig. 12 the position of a gripper is shown just as it approaches a gripping station, as for instance station D. Let us suppose this station has been set for a narrow width of material after having just been used for a wide band. As the gripper reaches the station, flange 63 contacts with cam bar 65, and it is obvious that as the chains 5 move the grippers to the left in this figure they will follow the paths shown in straight dashed lines in the lower part of Fig. 13. When at position $p$ the jaws are open and the star wheels 54 engage the pin chains 78 causing the jaws to gradually close, as shown in broken curved lines, being completely closed and engaging the edges 13 of strip 1 when in position $q$.

When flange 63 by striking cam bar 65 moves in the direction of the arrow, Fig. 9, it moves the inner tube 55 alone at first against the tension of spring 60 until one edge 110 of casting 62 strikes the end 111 of tube 56, and forcibly moves 56, overcoming the friction between 71 and 56. When strip material of uniform width is repeatedly used no other movement is necessary and the contact of a flange 63 or 64 with a cam bar 65 or 66 is of but short duration. As explained the showing in Figs. 12 and 13 represent the narrowest possible setting following the widest setting of which the machine is capable. Obviously if the settings are reversed cam bar 66 would be in the path of flange 64, instead of cam bar 65 being in the path of flange 63.

As this will be the case only when the grippers are not engaging strip material, the spring 60 is relaxed and the pin 59 will be in engagement with the end of slot 58 and the unit will be moved at once without any preliminary relative movement between parts 55 and 56.

Where a narrower strip setting is to be made by cam 63 the gripper continues to be moved after edge 110 contacts with tube end 111, thus moving tube 56 against the friction provided by block 71 and spring 72 best shown in Fig. 17. The maximum inward movement of the jaw is obtained when flange 63 reaches the short track 105. When the flange passes shoulder 106 it drops back slightly to track 107 and the jaws are then operated to grip the material. The jaws at the instant of gripping are therefore not quite at the limit of inward movement, this movement being taken up by spring 60, which thereby exerts a slight tension only on the clamp at this time, that is while the flange is in contact with track 107. If the material 1 should later shrink in the process the pull would be on spring 60 and not upon the much stiffer friction of block 71 and spring 72. After the jaws close upon the fabric edge 13, flange 63 rides off the end of track 107 so that the spring 60 is unhindered in its tendency to draw in upon the jaws on the resilient side of the machine.

It will be seen that the cam bars 66 are used only when the spacing between the gripping units is to be increased; while the bars 65 are used, not only when the spacing between the units is to be decreased but also at every gripping operation in order to relieve the tension while the grips are applied. They may or may not be used during the de-gripping operation, but preferably will be used then also.

This lateral tension is of use not only to allow for inequalities in the width of the material and for shrinking but also to keep the material from buckling as it moves around curves as in the tortuous course pursued in the drier. As the material is under lateral tension it is not liable to buckle or kink in a longitudinal direction.

However, particularly, if the material used is a light fabric, I may install in the loops formed in the material as it passes around bends, air blowers 140 that tend to distend the loops of material and keep it smooth around these bends.

Since a gripping station has been described in detail, a detailed description of a de-gripping station is unnecessary, as the operations are merely reversed, the pin chain moving in a direction which will open instead of closing the jaws.

The operation of the illustrated embodiment of my invention is as follows: The strip material 1 is led from the supply station A through the coating station B where a coating is placed on one or both sides, and from which it is drawn to chamber C where it is seized by the jaws at station D. In chamber C I prefer to circulate cool air, and this may be done by any of the usual methods. I prefer to have the chains 5$^A$ move as little as possible outside of chamber C and to this end the sheet 1 is de-gripped at F, and chains 5$^A$ make a circuit over sprockets 200, 201, 202, 203 and 204. In this way the temperature of the chain is not radically altered and difficulties due to moisture condensing on the chain are practically overcome. Chamber C is shown broken, as preferable it is of considerable length. I provide a smooth runway for supporting horizontal lengths of chain, such as is shown at 205, to prevent sagging.

Chamber E is provided with spaced chains 5$^B$ which carry the strip 1 of material in a plurality of loops over spaced upper sprockets 210 and lower sprockets 211, the chains being then guided through an endless path by sprockets 212, 213, 214, 215, 216, 217, 218 and 219. As in chamber C a runway 220 is provided for the horizontal stretches of chain. There is a gripping station G and a de-gripping station H, the coating being set on the material 1 when it enters the chamber E and being dried when it leaves at station H to be rewound at station R where it is wound into rolls of suitable commercial size at 230.

With a machine constructed as above described endless bands of material can be coated on one or both sides and may be conveyed to the various treatment chambers in a flat condition without either side coming in contact with any part of the machine with the exception of narrow strips at the edges.

The fact that the edges are uncoated permits the jaws to have a firm even grip and avoids any tendency for them to adhere to the film when released, a difficulty that frequently occurs in the handling of coated material.

It is to be understood that some of the figures are purposely rather diagrammatic and that details such as walls, supports and other obviously necessary features are omitted since the inclusion of all these would merely obscure the showing and understanding of the invention. I have however shown in considerable detail those parts the structure of which is important and constitutes a part of my invention, and I have shown sufficiently all those features which are necessary to an understanding of the relation of the different elements, so that those skilled in this art can construct apparatus embodying my invention.

It is to be further understood that numerous embodiments of my invention are possible, and I contemplate as within the scope of my invention all such modifications and equivalents as fall within the terms of the appended claims.

Having thus described my invention what I claim as new and desire to secure by Letters Patent is:

1. In combination, a conveyer chain, certain links of which have transverse passages, a gripping unit carried by each of said links and frictionally engaged in the passage thereof, whereby the units normally are fixed in position with respect to the links but are capable of movement with respect thereto when submitted to pressure sufficient to overcome the friction.

2. In combination, a conveyer chain, certain links of which have transverse passages, supports slidable within said passages, gripping members carried by said supports and spring pressed friction members in said passages adapted to engage said supports and hold them normally against movement, but permitting them to be moved.

3. In combination, a conveyer chain, certain links of which have transverse passages, a gripping unit carried by each of said links and frictionally engaged in the passage thereof, whereby the units normally are fixed in position with respect to the links but are capable of movement with respect thereto, and a cam track beside the conveyer chain and adapted to engage the units and move them with respect to the links.

4. In combination, a conveyer chain, certain links of which have transverse passages, a gripping unit carried by each of said links and frictionally engaged in the passage thereof, whereby the units normally are fixed in position with respect to the links but are capable of movement with respect thereto, an extension on each unit and a manually adjustable cam track beside the conveyer chain adapted to engage the extensions and move the units transversely of the links.

5. In combination, a conveyer chain, certain links of which have transverse passages, a gripping unit carried by each of said links and frictionally engaged in the passage thereof, whereby the units normally are fixed in position with respect to the links but are capable of movement with respect thereto, two extensions on each unit, two manually adjustable cam tracks beside the conveyer chain, one track being capable of being positioned to engage one extension and move the unit in one direction transversely of the chain, and the other being capable of being positioned to engage the other extension and move the unit in the other direction transversely of the chain.

6. In combination, a pair of spaced conveyer chains, gripping units carried by said chains and carrying facing clamps adapted to engage and convey a sheet between the chains, the units on at least one chain being adjustable transversely of the chain to vary the distance between the facing clamps, and cam means beside said conveyer chain adapted to engage said unit and adjust it transversely of the chain.

7. In combination, a pair of spaced conveyer chains, gripping units carried by said chains and carrying facing clamps adapted to engage and convey a sheet between the chains, the units on at least one chain being adjustable transversely of the chain to vary the distance between the facing clamps, and manually adjustable cam means beside said conveyer chain adapted to engage said unit, and adjust it transversely of the chain and toward or from the other chain.

8. In combination, conveyer means, gripping units carried by said conveyer means and including facing clamps adapted to engage a sheet between them, resilient means tending to draw said clamps apart to exert lateral tension on a sheet engaged thereby, means to operate said clamps to engage the sheet and means to counteract the resilient means while the clamps are being operated.

9. In combination, a pair of endless carriers, gripping units on said carriers and including facing clamps adapted to engage a sheet between them, resilient means tending to draw said clamps apart to exert lateral tension on a sheet engaged thereby, means for automatically operating said clamp at a predetermined position, and means for automatically relieving the tension while the clamps are being operated.

10. In combination, conveyer means, gripping units carried by said conveyer means and including facing clamps adapted to engage a sheet between them, resilient means tending to draw said clamps apart to exert a lateral tension on a sheet engaged thereby, means operative first to relieve the tension and then to adjust the position of certain of said clamps laterally to adapt them for a sheet of different width.

11. In combination, conveyer means, gripping units carried by said conveyer means and including facing clamps adapted to engage a sheet between them, resilient means tending to draw said clamps apart to exert a lateral tension on a sheet engaged thereby, means operative first to relieve the tension and then to adjust the position of certain of said clamps laterally to adapt them for a sheet of different width, and means then operative to operate the clamps.

12. In combination, conveyer means, gripping units carried by said conveyer means and including facing clamps adapted to engage a sheet between them, resilient means tending to draw said clamps apart to exert a lateral tension on a sheet engaged thereby, means operative automatically first to relieve the tension, then to adjust laterally the position of the clamps on one side, then to restore a slight lateral tension, then to operate the clamps to grip the material and then to restore fully the lateral tension.

13. In combination, conveyer means, gripping units carried by said conveyer means and including facing clamps adapted to engage a sheet between them, resilient means tending to draw said clamps apart to exert a lateral tension on a sheet engaged thereby, manually adjustable cam means operative first to relieve the tension and then to adjust laterally the position of the clamps on one side to adapt them for a sheet of different width, cam means for then restoring the tension slightly, cam means then operative to operate the clamps to grip the material and cam means then operative to restore fully the lateral tension.

14. An endless conveyer comprising two carriers, guide means similarly arranged and in engagement with the carriers to guide them in spaced relation over a tortuous course, facing gripping means carried by said carriers and adapted to grip the opposite edges of a sheet of material, and resilient means tending to draw said grippers apart, whereby lateral tension is exerted on a web as it is conveyed by the grippers over a tortuous course.

15. A conveyer comprising an endless carrier, gripper supports carried by said carrier, gripping jaws carried by said supports and having open and closed positions, a single means positively engaging said jaws to hold them in open or in closed position and to move them positively from one position to the other, and means beside the path of the carrier to control the operation of said engaging means.

16. A conveyer comprising an endless carrier, gripper supports carried by said carrier, gripping jaws pivoted on said supports and having open and closed positions, a bar movable transversely of the carrier to open or close the jaws and to hold them in open or closed position, and an obstacle beside the path of the carrier adapted to control the operation of the bar.

17. A conveyer comprising an endless carrier, gripper supports carried by said carrier and each carrying a pair of pivoted jaws, a bar movable transversely of the carrier to open and close the jaw, a screw adapted when turned to move the bar and having a pinion at one end, a chain parallel to the endless carrier at one position in its path and adapted to engage the pinion as the carrier carries it along and to turn the pinion and thus operate the jaws.

18. In combination, a conveyer chain, pairs of pivoted gripping jaws carried on said chain, bars carried by said chain and longitudinally movable to open and close said jaws, screw means adapted when turned to move said bars and having obstacle engaging handles, and an obstacle in the path of said handles and adapted to cause the turning of the handles and the operation of the jaws.

19. A clamp designed for use in an endless conveyer and comprising a support, a pair of jaws carried by said support and having an open and a closed position, a single means positively engaging said jaws to hold them in open or closed position and to move them positively from one position to the other, and means for operating said engaging means.

20. A clamp designed for use in an endless conveyer and comprising a support, a pair of jaws carried by said support, a slidable member operatively connected to said jaws and having a threaded bore and a screw engaging said bore and adapted to be turned to slide said member and thus operate the jaws.

21. A clamp designed for use in an endless conveyer and comprising a support, a pair of jaws pivoted on said support and having gear teeth, a slidable rack bar engaged with said teeth and having a longitudinal threaded bore and a screw engaging said bore and adapted to be turned to slide said rack bar and thus operate the jaws.

22. A clamp designed for use in an endless conveyer and comprising a tubular member, a pair of elbow shaped jaw members pivoted to the end of the tubular member and having opposing jaws at one end of the elbow members adapted to swing toward and from one another and gear teeth on the facing sides of the other end thereof, a rack member slidable in the tubular member and having teeth adapted to engage the teeth on the jaw members, and means to move the rack lengthwise to move the jaw members.

Signed at Rochester, New York, this 9th day of July, 1924.

JOHN G. JONES.